Sept. 29, 1936.  E. DOZLER  2,056,040
CONTROL SYSTEM
Filed Jan. 30, 1935
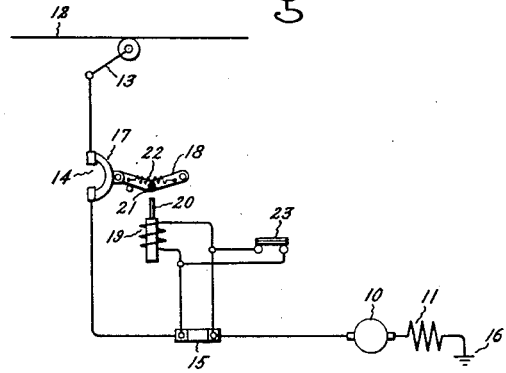
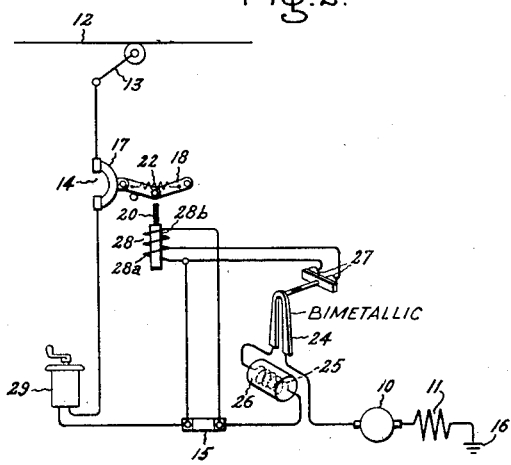
Inventor:
Ernst Dozler,
by Harry E. Dunham
His Attorney.

Patented Sept. 29, 1936

2,056,040

UNITED STATES PATENT OFFICE 2,056,040

CONTROL SYSTEM

Ernst Dozler, Berlin-Charlottenburg, Germany, assignor to General Electric Company, a corporation of New York Application January 30, 1935, Serial No. 4,203
In Germany February 15, 1934

6 Claims. (Cl. 175—294)

My invention relates to control systems for motors of the type arranged to operate for short periods of time at substantially greater than their normal rated loads, and has for an object the provision of a thermal protective means which prevents operation of the motor on overload during the time that the motor temperature exceeds a predetermined limit, while providing for operation of the motor at a reduced load during that time.

Heretofore the driving motors of electrically driven vehicles have been designed to have a large thermal capacity so that they could be operated for short periods without being heated to a dangerously high temperature, a temperature which would damage the insulation and cause an electrical failure of the motor. When the motor temperature, however, exceeded a predetermined limit, overload devices operated to deenergize the motors and functioned to maintain the motors deenergized until the temperature of the motors had decreased a predetermined amount. While such systems are entirely operative and afford ample protection for the motors, something is yet to be desired in providing for the energization of the motors with minimum delay after their deenergization.

In accordance with my invention it is unnecessary to deenergize the motors immediately after the predetermined temperature limit has been exceeded providing the motor load is reduced to or slightly below the continuous rated load of the motor. With reduced load I have found that the motor will cool almost as rapidly as if it were brought to a standstill. More specifically, I provide a thermal relay responsive to the temperature of the motor for controlling the tripping means of the circuit breaker to cause said tripping means to open the circuit to deenergize the motor. After the predetermined motor temperature has been exceeded and the thermal relay has operated, the circuit breaker of course immediately deenergizes the motor. However, the circuit breaker can be at once reclosed and the motor energized at the reduced load fixed by the tripping point of the circuit breaker.

For a more complete understanding of my invention reference should now be had to the accompanying drawing wherein I have shown diagrammatically in Fig. 1 a control system embodying my invention, while Fig. 2 illustrates a modified form of a control system embodying my invention.

Referring to the drawing, I have shown my invention in one form as applied to the control of a motor 10 provided with a field winding 11 and arranged to drive a vehicle (not shown). The motor 10 is supplied with power from a supply line 12 by means of a trolley 13, a circuit breaker 14, a shunt 15 and the ground connection 16. The circuit breaker 14 is provided with a bridging member or movable contact 17 which is normally held in the closed circuit position by means of a locking toggle 18. This toggle can be broken by means of a tripping coil 19 operating when energized a plunger 20 which moves the knee pivot 21 of the toggle past its dead-center position. A tension spring 22 therefor operates the movable contact 17 to the open circuit position, to deenergize the motor 10. Normally the tripping coil 19 is short circuited by means of a bimetal thermal element 23 which is heated in accordance with the temperature of the motor. The thermal element 23, constructed of two metals having different coefficients of expansion, when heated a predetermined amount flexes to break the by-pass circuit around the tripping coil 19. If desired, the thermal element 23 may be mounted directly on the frame of the motor and thus be directly responsive to the motor temperature.

As soon as the thermal element 23 has opened the by-pass circuit around the tripping coil 19 the motor current flowing through the shunt 15 causes a proportional current to flow through the tripping coil 19. Preferably the coil 19 trips the breaker 14 when the motor current is slightly less than the normal rated current. Consequently, the breaker deenergizes the motor in response to the joint temperature and current condition of the motor.

By reclosing the circuit breaker the operation of the motor 10 can be resumed without delay provided the motor load does not exceed a load which will cause the tripping coil 19 to open the circuit breaker 14. In this manner the motor load is limited until the motor temperature decreases to a safe value.

Instead of mounting the thermal element 23 directly to the motor frame a replica type thermal relay can be employed, which relay will reproduce the temperature of the motor. A satisfactory replica type relay is described in United States Letters Patent No. 1,501,017—Hall—dated July 8, 1924.

Referring to Fig. 2 of the drawing, a replica type thermal relay of the type shown in the Hall patent will be described by saying that it consists of a bimetallic thermal element 24 connected in series circuit relation with a heating coil 25 and the motor 10. The element 24 is arranged in thermal relationship with a mass of material 26 which surrounds the heating coil 25. The size of the heating coil 25 and the mass of material 26 which surrounds it are so proportioned that heat is conducted to the thermal element to increase its temperature at the same rate that the temperature of the motor rises with comparatively small overloads. The current flowing through the thermal element 24 directly heats the thermal element and causes it to operate with a smaller time delay in response to overload currents of substantial magnitude. The operation of the replica type relay is therefore responsive to the motor temperature.

The contacts 27 operable by the thermal element 24 are normally closed to short circuit a portion 28a of the tripping coil 28, the remaining turns 28b of the coil being effective at all times to operate the plunger 20 to open the circuit breaker 14. This feature is an advantage since the circuit breaker 14 will be instantly opened in case a current of short circuit magnitude flows to the motor 10.

After the thermal element 24 has operated to open its contacts 27 it will maintain them in the open circuit position until the element 24 and the mass of material 26 cools sufficiently for the thermal element 24 to return to its closed position. This cooling of course will be proportional in degree and identical in time with the cooling of the motor 10. During the cooling interval the entire tripping coil 28 will be effective and the circuit breaker 14 will therefore operate to deenergize the motor 10 on lower values of current. By means of the controller 29 the motor load or current can be controlled so that the tripping coil 28 will not be effective to trip the circuit breaker. Therefore the vehicle can be kept under way at low speed or low load until the motors have cooled sufficiently for the resumption of operation at full load and above full load.

If desired, additional contacts can be operated by the thermal element 24 to signal that the relay has operated to limit the permissible load of the motors.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. A control system for a motor comprising a circuit breaker movable between open and closed circuit positions for controlling the energization of said motor, tripping means operable to cause movement of said circuit breaker to deenergize said motor, and means jointly responsive to the temperature and current conditions of said motor for operating said tripping means to deenergize said motor when the temperature of said motor approaches a dangerously high temperature, said last mentioned means providing for operation of said motor after reclosure of said circuit breaker at current values less than a current value which will maintain said dangerously high motor temperature.

2. A control system for a motor comprising a circuit breaker operable between open and closed circuit positions for controlling the energization of said motor, tripping means responsive to predetermined high values of current for causing operation of said circuit breaker to deenergize said motor, and means responsive to a predetermined high temperature of said motor for controlling said tripping means after reclosure of said circuit breaker to cause said tripping means to operate in response to a decreased value of motor current to provide for energization of said motor at a current value insufficient to maintain said predetermined high motor temperature.

3. Means for operating a motor with a predetermined low load after the motor temperature has exceeded a predetermined value comprising a circuit breaker responsive to predetermined high values of motor current for automatically deenergizing said motor, said circuit breaker being immediately reclosable to reenergize said motor, and thermal means responsive to a predetermined high temperature of said motor for reducing to a low value the current required for automatic deenergization of said motor after reclosure of said circuit breaker.

4. Means for cooling a motor from a predetermined high temperature produced by a heavy motor load comprising a circuit interrupter operable in response to high values of motor current for deenergizing said motor, said circuit interrupter being immediately reclosable to reenergize said motor and thermal means responsive to said predetermined high motor temperature for controlling said circuit interrupter after said reclosure to decrease the value of current required to deenergize said motor, thereby providing for operation of said motor at a reduced load which does not materially affect the cooling of said motor from said high temperature.

5. In combination, a motor operable at different loads, motor control means for controlling the load of said motor, automatic means responsive to a high motor current which produces a dangerously high motor temperature for deenergizing said motor, said automatic means being immediately reclosable to reenergize said motor, and thermal means responsive to said motor temperature for controlling operation of said automatic means after said reclosure to render said automatic means responsive to a current insufficient to maintain said high temperature whereby said motor is thereafter limited to operation at a current value low enough to permit said motor to cool while operating with said low current.

6. In combination, a motor the temperature of which rises to a dangerously high degree when operated above a predetermined rated load, a circuit interrupter for deenergizing said motor, automatic means for operating said circuit breaker to deenergize said motor, said circuit interrupter being immediately reclosable to reenergize said motor and thermal means normally rendering said automatic means ineffective and operative in response to said high motor temperature for rendering said automatic means effective to deenergize said motor, said thermal means and said automatic means cooperating after said reclosure of said circuit interrupter to provide for low load operation of said motor until said motor temperature has decreased a predetermined amount and then automatically cooperating to provide for operation of said motor above said rated load.

ERNST DOZLER.